US010807738B2

(12) United States Patent
Dauenhauer et al.

(10) Patent No.: US 10,807,738 B2
(45) Date of Patent: Oct. 20, 2020

(54) MAINTENANCE OPERATION ANALYTICS

(71) Applicant: General Electric Company, Schenectady, NY (US)

(72) Inventors: David Geoffrey Dauenhauer, Cincinnati, OH (US); Ronald Matthew DiMuro, Loveland, OH (US); Peter Andrew Flynn, Delmar, NY (US); Michael Edward Eriksen, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 285 days.

(21) Appl. No.: 15/798,907

(22) Filed: Oct. 31, 2017

(65) Prior Publication Data
US 2018/0155060 A1 Jun. 7, 2018

Related U.S. Application Data

(60) Provisional application No. 62/428,605, filed on Dec. 1, 2016.

(51) Int. Cl.
*B64F 5/30* (2017.01)
*G05B 23/02* (2006.01)
(Continued)

(52) U.S. Cl.
CPC ............... *B64F 5/30* (2017.01); *B64F 5/40* (2017.01); *B64F 5/60* (2017.01); *F01D 25/002* (2013.01);
(Continued)

(58) Field of Classification Search
CPC ..... B64F 5/30; B64F 5/40; B64F 5/60; G07C 5/085; G06Q 10/20; G05B 23/0283; F01D 25/002
See application file for complete search history.

(56) References Cited

U.S. PATENT DOCUMENTS 7,162,354 B2   1/2007 Takada et al.
8,197,609 B2   6/2012 Alvestig et al.
(Continued)

FOREIGN PATENT DOCUMENTS

EP    3029275 A1    6/2016
EP    3 051 075 A1  8/2016

OTHER PUBLICATIONS

Extended European Search Report and Opinion issued in connection with corresponding EP Application No. 17204352.3 dated Apr. 3, 2018.
(Continued)

*Primary Examiner* — Tuan C To
*Assistant Examiner* — Kelly D Williams
(74) *Attorney, Agent, or Firm* — Dority & Manning, P.A.

(57) ABSTRACT

One example aspect of the present disclosure is directed to a method for enhancing a maintenance operation routine. The method includes receiving, at one or more processors, engine history data. The method includes comparing, at the one or more processors, the received engine history data to expected engine history data. The method includes determining, at the one or more processors, an expected effectiveness of a plurality of maintenance operation types based on the comparison. The method includes selecting, at the one or more processors, one of the plurality of maintenance operation types based on the determinations. The method includes transmitting, at the one or more processors, a signal indicative of a notification of the selected maintenance operation type.

18 Claims, 8 Drawing Sheets

(51) Int. Cl.
   *F01D 25/00* (2006.01)
   *B64F 5/60* (2017.01)
   *B64F 5/40* (2017.01)
   *G06Q 10/00* (2012.01)
   *G07C 5/08* (2006.01)

(52) U.S. Cl.
   CPC ......... *G05B 23/0283* (2013.01); *G06Q 10/20* (2013.01); *G07C 5/085* (2013.01)

(56) References Cited

U.S. PATENT DOCUMENTS

| | | |
|---|---|---|
| 8,273,184 B2 | 9/2012 | Wagner |
| 8,685,176 B2 | 4/2014 | Wagner |
| 9,162,262 B2 | 10/2015 | Alvestig et al. |
| 9,657,590 B2 | 5/2017 | Griffiths et al. |
| 2014/0174474 A1 | 6/2014 | Elanayake et al. |
| 2015/0121888 A1 | 5/2015 | Ekanayake et al. |
| 2016/0010497 A1 | 1/2016 | Griffiths et al. |
| 2016/0067750 A1 | 3/2016 | Griffiths et al. |
| 2016/0160679 A1* | 6/2016 | Griffiths ................. B08B 3/003 134/57 R |
| 2016/0230592 A1* | 8/2016 | Saenz ................. B01F 7/00558 |

OTHER PUBLICATIONS

U.S. Appl. No. 15/642,790, filed Jul. 6, 2017.
U.S. Appl. No. 15/642,801, filed Jul. 6, 2017.
U.S. Appl. No. 15/472,456, filed Mar. 29, 2017.
U.S. Appl. No. 15/493,044, filed Apr. 20, 2017.
U.S. Appl. No. 15/490,524, filed Apr. 18, 2017.
European Office Action Corresponding to Application No. 17204352 dated Aug. 6, 2020.

* cited by examiner

520 —

CLEANING DELIVERY METHOD - ENTRY POINT LOCATION

|  | Baseline | Ex 1 | Ex 2 | Ex 3 |
|---|---|---|---|---|
| η compressor | 90% | 85% | 90% | 90% |
| η HPT | 90% | 90% | 85% | 90% |
| η LPT | 90% | 90% | 90% | 85% |
| Engine Inlet | | | | |
| Benefit Factor | | 0.6 | 0.4 | 0.4 |
| Cost Factor | | 0.2 | 0.2 | 0.2 |
| Net Benefit | | 0.4 | 0.2 | 0.2 |
| Booster Inlet | | | | |
| Benefit Factor | | 0.6 | 0.4 | 0.4 |
| Cost Factor | | 0.2 | 0.2 | 0.2 |
| Net Benefit | | 0.4 | 0.2 | 0.2 |
| Ignitor Port | | | | |
| Benefit Factor | | 0.4 | 0.7 | 0.4 |
| Cost Factor | | 0.3 | 0.3 | 0.3 |
| Net Benefit | | 0.1 | 0.4 | 0.1 |
| Borescope Port | | | | |
| Benefit Factor | | 0.4 | 0.7 | 0.4 |
| Cost Factor | | 0.3 | 0.3 | 0.3 |
| Net Benefit | | 0.1 | 0.4 | 0.1 |
| Engine Exhaust | | | | |
| Benefit Factor | | 0.3 | 0.3 | 0.6 |
| Cost Factor | | 0.25 | 0.25 | 0.25 |
| Net Benefit | | 0.05 | 0.05 | 0.35 |

CLEANING DURATION

|  | Baseline | Ex 4 | Ex 5 | Ex 6 |
|---|---|---|---|---|
| $\eta$ compressor | 90% | 85% | 80% | 75% |

Clean Duration
Short:
| | | | | |
|---|---|---|---|---|
| Benefit Factor | | 0.5 | 0.5 | 0.5 |
| Cost Factor | | 0.2 | 0.2 | 0.2 |
| Net Benefit | | 0.3 | 0.3 | 0.3 |

Medium
| | | | | |
|---|---|---|---|---|
| Benefit Factor | | 0.6 | 0.7 | 0.7 |
| Cost Factor | | 0.35 | 0.35 | 0.35 |
| Net Benefit | | 0.25 | 0.35 | 0.35 |

Long:
| | | | | |
|---|---|---|---|---|
| Benefit Factor | | 0.6 | 0.7 | 0.9 |
| Cost Factor | | 0.4 | 0.4 | 0.4 |
| Net Benefit | | 0.2 | 0.3 | 0.5 |

CLEANING MEDIUM - INTERACTION

|  | Baseline | Ex 7 | Ex 8 | Ex 9 |
|---|---|---|---|---|
| $\eta$ HPT | 90% | 85% | 80% | 75% |
| Cleaning Medium | | | | |
| Low Interaction | | | | |
| Benefit Factor | | 0.35 | 0.35 | 0.35 |
| Cost Factor | | 0.2 | 0.2 | 0.2 |
| Net Benefit | | 0.15 | 0.15 | 0.15 |
| Medium Interaction | | | | |
| Benefit Factor | | 0.4 | 0.5 | 0.5 |
| Cost Factor | | 0.3 | 0.3 | 0.3 |
| Net Benefit | | 0.1 | 0.2 | 0.2 |
| High Interaction | | | | |
| Benefit Factor | | 0.4 | 0.5 | 0.7 |
| Cost Factor | | 0.4 | 0.4 | 0.4 |
| Net Benefit | | 0 | 0.1 | 0.3 |

FIG. 8

MAINTENANCE OPERATION ANALYTICS

PRIORITY CLAIM

The present application claims the benefit of priority of U.S. Provisional Patent Application No. 62/428,605, entitled "ENGINE WASH ANALYTICS," filed Dec. 1, 2016, which is incorporated herein by reference for all purposes.

FIELD

The present subject matter relates generally to aerial vehicles.

BACKGROUND

An aerial vehicle can rely on one or more engines to control the aerial vehicle. Engine performance can be affected by cleanliness of the engine as well as other factors. Performing engine maintenance operations such as washing regularly can improve the performance of the engine and extend the life of the engine. However, different types of operations such as different types of engine washes can have different costs and different levels of effectiveness.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a system for enhancing an engine wash routine. The system includes one or more memory devices and one or more processors. The one or more processors are configured to receive first engine history data, compare the first engine history data to expected engine history data, and determine an expected effectiveness of a plurality of engine wash types based on comparing the first engine history data to the expected engine history data. The one or more processors are configured to select one of the plurality of engine wash types based on the expected effectiveness of the plurality of engine wash types, and transmit a signal indicative of a notification of a selected engine wash type.

Another example aspect of the present disclosure is directed to a method for enhancing an engine wash routine. The method includes receiving, at one or more processors, first engine history data, comparing, at the one or more processors, the first engine history data to expected engine history data, and determining, at the one or more processors, an expected effectiveness of a plurality of engine wash types based on comparing the first engine history data to the expected engine history data. The method includes selecting, at the one or more processors, one of the plurality of engine wash types based on the expected effectiveness of the plurality of engine wash types, and transmitting, at the one or more processors, a signal indicative of a notification of a selected engine wash type.

Another example aspect of the present disclosure is directed to a non-transitory computer-readable medium storing computer instructions, that when executed by one or more processors, cause the one or more processors to perform operations. The operations comprise receiving first engine history data, comparing the first engine history data to expected engine history data, and determining an expected effectiveness of a plurality of maintenance operation types based on comparing the first engine history data to the expected engine history data. The operations comprise selecting one of the plurality of maintenance operation types based on the expected effectiveness of the plurality of maintenance operation type, and transmitting a signal indicative of a notification of a selected maintenance operation type.

Other example aspects of the present disclosure are directed to systems, methods, aerial vehicles, avionics systems, devices, non-transitory computer-readable media for enhancing a maintenance operation routine. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts a table describing an example of a cost/benefit analysis for selecting a cleaning delivery method.

FIG. 7 depicts a table describing an example of a cost/benefit analysis for selecting a cleaning duration.

FIG. 8 depicts a table describing an example of a cost/benefit analysis for selecting a cleaning medium based on a cleaning medium interaction.

DETAILED DESCRIPTION

Figure 1:
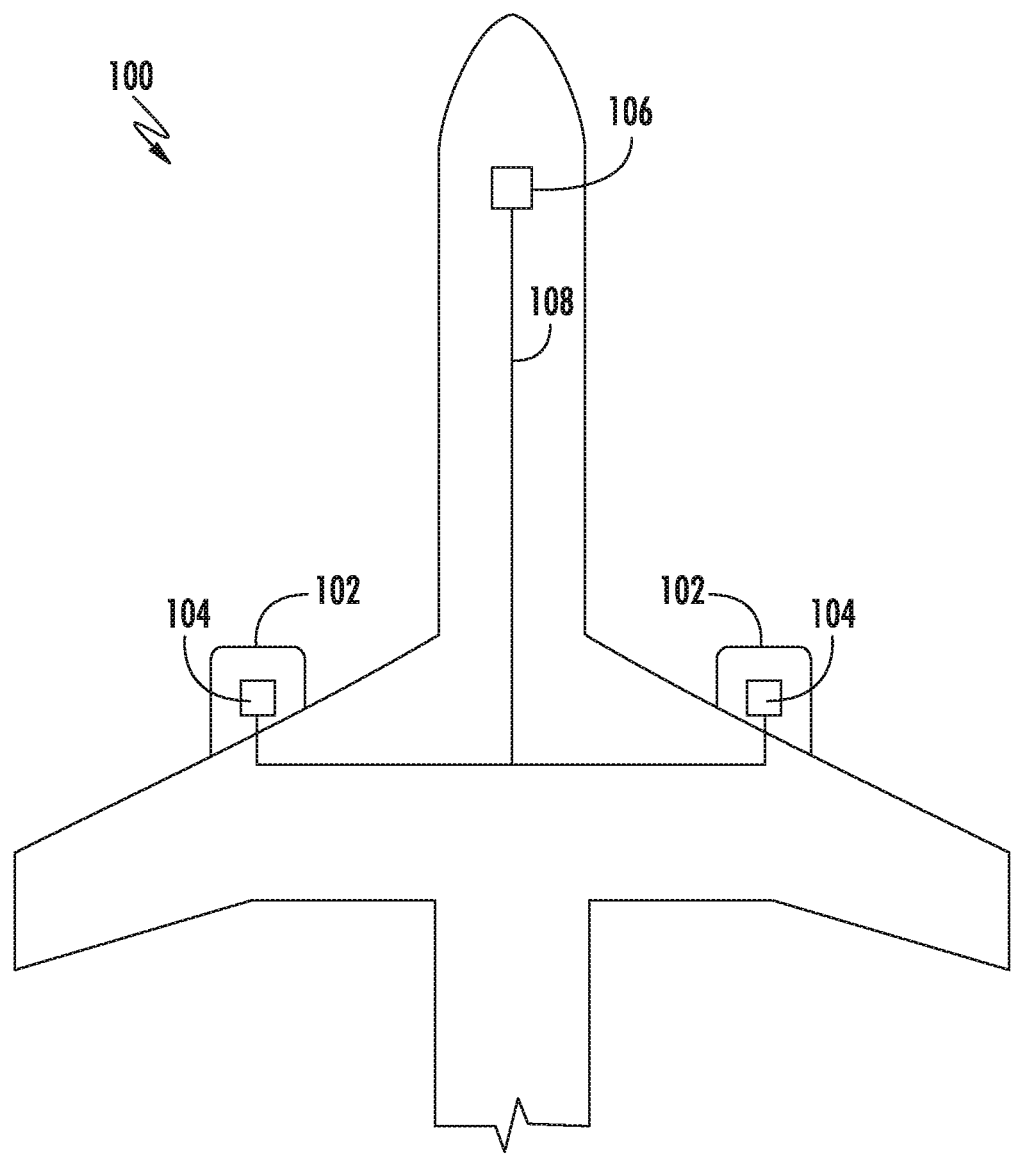
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems for selecting a maintenance operation type. Maintenance operations for a jet engine can include, but are not limited to, engine inspections, engine washes, and engine (e.g, component) repair. Different engines experience different environmental and operating conditions that may affect the performance of an engine. Additionally, different types of maintenance operations can have different levels of effectiveness as well as different associated costs.

In accordance with example embodiments, a maintenance operation type is selected for a particular engine based on engine history data associated with the engine. For example, an expected level of deterioration of an engine can be compared with a measured level of deterioration. Based on the deterioration comparison, an appropriate maintenance operation type can be selected. For example, if a level of deterioration exceeds an expected level of deterioration, a higher cost maintenance operation type may be selected. If the level of deterioration is less than the expected level, a lower cost maintenance operation can be selected. By way of example, selecting a maintenance operation type may include selecting a first more costly engine inspection or wash type in response to higher levels of deterioration, and selecting a second less costly engine inspection or wash type in response to higher levels of deterioration. Similarly, a component replacement repair type may be selected in response to higher levels of deterioration, while a component overhaul repair type may be selected in response to lower levels of deterioration.

Example aspects of the present disclosure are directed to methods and systems that can select an engine wash type. Dirty engines can experience deterioration, also known as a lack in performance. Washing an engine can reduce deterioration. Different types of engine washes can have different levels of effectiveness in terms of reducing deterioration.

However, each different type of engine wash can have a different associated cost. An associated cost can include a price, a wait time, etc. Generally, the more effective an engine wash type a higher associated cost. An engine wash type can include a cleaning medium, a delivery method, and/or a cleaning duration. The cleaning medium can include water, water and detergent, water and Isopropyl Alcohol, a foaming solution, and the like, and/or any combination of the foregoing. Different cleaning mediums provide different cleaning medium interactions. Different cleaning mediums may include different chemistries, volumes, pressures, velocities, abrasiveness, viscosity, and/or temperature etc. of the medium. Other modifications to the cleaning medium, under the conditions in which it is contacting a cleaning surface, may also alter the cleaning medium interaction. The delivery method can include a delivery location, such as delivery via an engine inlet, delivery via a booster inlet, delivery via an igniter port, delivery via a borescope port, delivery via an engine exhaust, and the like, and/or any combination of the foregoing.

A deterioration can be determined measuring by one or more engine parameters Exhaust Gas Temperature (EGT), EGT Hot Day Margin (EGTHDM), fuel burn, modular efficiency, other analytic measures of engine performance, the like, and/or any combination of the foregoing. The determined deterioration can be compared against an expected deterioration. The expected deterioration can be determined by aggregating a plurality of other engines. A type of engine wash can be selected based on the comparison. For example, when a determined deterioration exceeds a threshold level above an expected deterioration, a more effective and more costly engine wash may be appropriate than when a determined deterioration does not exceed the threshold level above the expected deterioration. In some embodiments, a cost benefit analysis is performed for different engine wash types based on engine history data in order to determine a particular engine wash delivery method, duration, and/or cleaning medium.

In this way, the systems and methods according to example aspects of the present disclosure have a technical effect of improving computational performance and/or operational engine performance by providing a more efficient way of determining a maintenance operation type such as an engine wash type for an engine. A computational performance may be improved through more efficient and more optimal considerations of engine health. Moreover, a technical effect of improving engine performance through more efficient and optimal wash types are provided. One or more processors performing the described functions are enabled for improved processing as well as to enable more efficient and optimal engine performance.

FIG. 1 depicts an example aerial vehicle 100 in accordance with example embodiments of the present disclosure. The aerial vehicle 100 can include one or more engines 102, one or more sensors 104, a computing system 106, and a communication bus 108 to connect at least one of the one or more sensors 104 with the computing system 106. The one or more sensors 104 can detect one or more parameters related to engine performance, such as Exhaust Gas Temperature (EGT), EGT Hot Day Margin (EGTHDM), fuel burn, modular efficiency, other analytic measures of engine performance, the like, and/or any combination of the foregoing. The one or more sensors 104 can communicate the one or more detected parameters to the computing system 106 via the communication bus 108. The computing system 106 can be, for example, the computing system 600 described in more detail in FIG. 9. The computing system 106 can transmit the detected one or more parameters to a computing system associated with a ground system.

The numbers, locations, and/or orientations of the components of example aerial vehicle 100 are for purposes of illustration and discussion and are not intended to be limiting. Those of ordinary skill in the art, using the disclosures provided herein, shall understand that the numbers, locations, and/or orientations of the components of the aerial vehicle 100 can be adjusted without deviating from the scope of the present disclosure.

Figure 2:
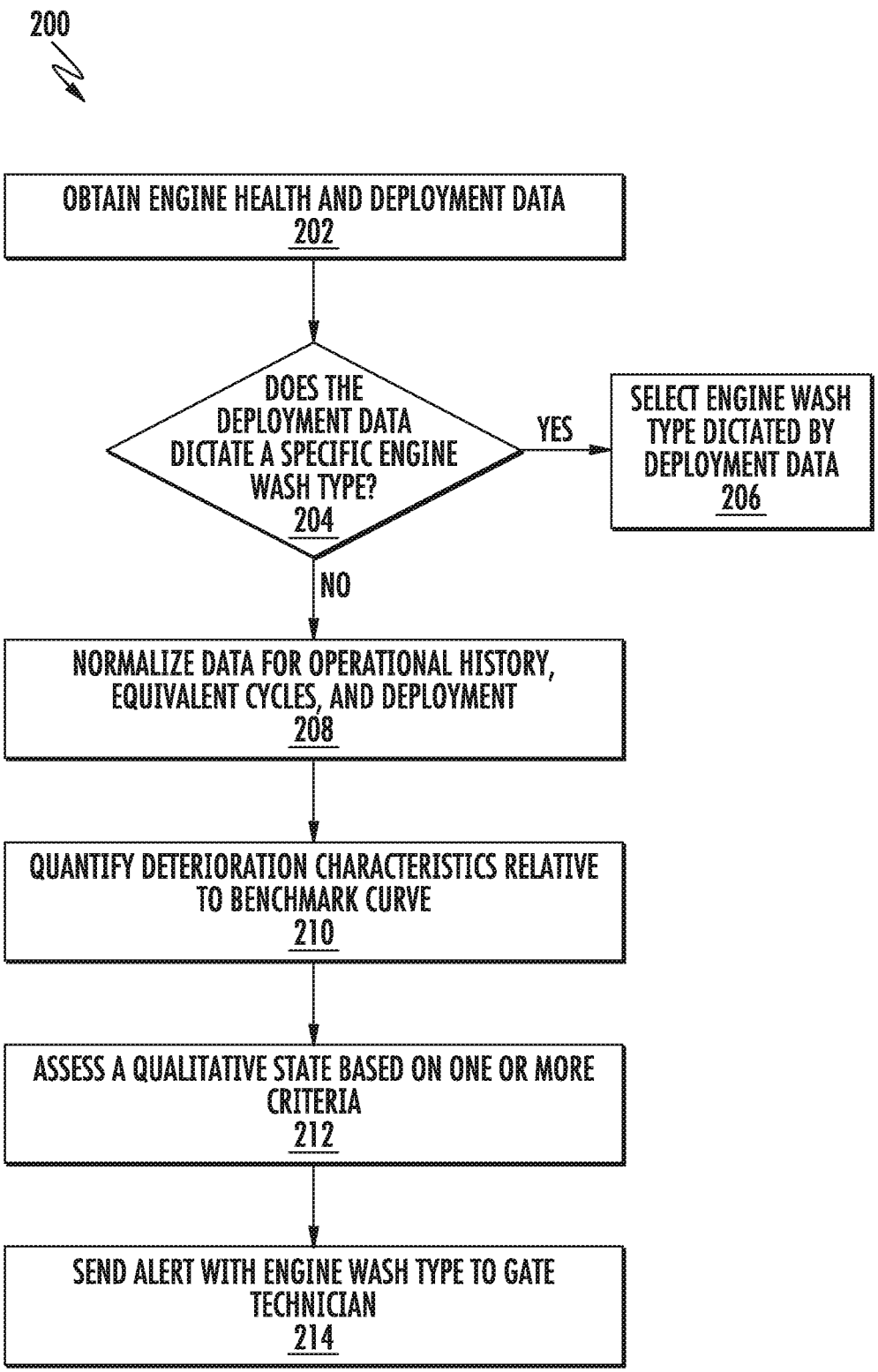
FIG. 2 depicts a flow diagram of an example method according to example embodiments of the present disclosure.

FIG. 2 depicts a flow diagram of an example method 200 for determining a maintenance operation type. FIG. 2 describes the determination of an engine wash type by way of example. It will be appreciated that the disclosed process may be used to determine other maintenance operation types, such as an inspection type or a repair type. The method of FIG. 2 can be implemented using, for instance, the computing system 600 of FIG. 9. FIG. 2 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (202), engine health data and deployment data can be obtained. Engine history data may refer to engine health data, deployment data, or a combination of engine health data and deployment data. For instance, the computing system 600 can obtain engine health data and deployment data. The engine health data can be obtained from the one or more sensors 104, for example. The engine health data and/or the deployment data can be obtained from a database for remote diagnosis, for example. The engine health data can include one or more parameters related to engine performance, such as Exhaust Gas Temperature (EGT), EGT Hot Day Margin (EGTHDM), fuel burn, modular efficiency, other analytic measures of engine performance, the like, and/or any combination of the foregoing. The engine health data can include remote diagnosis data. The deployment data can include operational history, derate history, environmental history, a number of equivalent cycles performed by an engine, the like, and/or any combination of the foregoing. The deployment data can also include specific instructions regarding an engine wash type. The engine health data can include remote diagnostics, operational data, data related to engine health, analytics data, trend data, health monitoring data, deployment data (describing usage), locational data, environmental data (present and historical), weather data (present and historical), satellite data, engine wash data, previous wash and repair data, engine configuration data, engine model data, hardware data, build data, part data, dimensional data, clearance data, future use and deployment data, number of cycles, number of hours, number of equivalent cycles, the like, and/or any combination of the foregoing.

At (204), a determination can be made of whether the deployment data dictates a specific engine wash type. For instance, the computing system 600 can determine whether the deployment data dictates a specific engine wash type. If a determination is made that the deployment data dictates a specific engine wash type, then the method 200 can move to (206). If a determination is made that the deployment data does not dictate a specific engine wash type, then the method 200 can move to (208). The engine wash type can include a cleaning medium, a delivery method, and/or a cleaning duration. The cleaning medium can include water, water and detergent, water and Isopropyl Alcohol, a foaming solution, and the like, and/or any combination of the foregoing. A cleaning medium may be include any solution having a particular chemistry, volume, hydrostatic pressure, velocity, abrasiveness, viscosity, temperature etc. The delivery method can include a delivery location such as delivery via an engine inlet, delivery via a booster inlet, delivery via an igniter port, delivery via a borescope port, delivery via an engine exhaust, and the like, and/or any combination of the foregoing. In other examples, block 204 may include determining whether the deployment data dictates other maintenance operation types, such as a particular engine inspection type or a particular component repair type. For example, block 204 may include determining that a fluorescent and penetrant inspection (FPI), magnetic particle inspection (MPI), or borescope inspection should be performed. Similarly, block 204 may include determining that a component replacement repair type should be performed, or that a component overhaul repair type should be performed. Various types of maintenance operation types may be selected at block 204.

At (206), an engine wash type dictated by the deployment data can be selected. For instance, the computing system 600 can select an engine wash type dictated by the deployment data. Block 206 may also include selecting a particular inspection or repair type in other examples. At (208), the engine health data can be normalized for the obtained deployment data. For instance, the computing system 600 can normalize the engine health data for the deployment data. For example, the operational history and/or the number of equivalent cycles performed by an engine can be used to normalize the engine health data. Normalizing the engine health data for the obtained deployment data can include determining a plurality of expected values for the engine health data based on the obtained deployment data. In addition, normalizing the engine health data can include accounting for variations in engine operating parameters such as ambient conditions including outside air temperature (OAT), pressure-altitude, airspeed and/or Mach number. Normalizing the engine health data can also include accounting for variations in parameters indicative of an overall level of operating power or output such as fan speed, core speed, exhaust gas temperature (EGT), compressor discharge pressure or thrust. The normalized engine health data can result in a benchmark curve, such as the graphs shown in FIG. 3 and/or FIG. 4.

At (210), deterioration characteristic relative to a benchmark curve can be quantified. For instance, the computing system 600 can quantify deterioration characteristics relative to a benchmark curve, such as the benchmark curve determined at (208). Quantifying deterioration characteristics relative to the benchmark curve can include comparing the determined expected values of the benchmark curve with actual values from the obtained engine health data. In an embodiment, at least some portion of a value below an expected value on the benchmark curve can be determined to be attributable to a cleanliness of the engine.

At (212), assess a qualitative state based on one or more criteria. For instance, the computing system 600 can assess a qualitative state based on one or more criteria. For example, a determination can be made of how effective an engine wash type would be based on the quantified deterioration characteristics relative to the benchmark curve. An engine wash type can be selected based on the assessed qualitative state. In other examples, a determination can be made of how effective other maintenance operation types would be, such as a type of repair or inspection. In some embodiments, assessing a qualitative state can include performing a cost benefit analysis for a maintenance operation type. For example, the costs- and benefits of different cleaning delivery methods such as different delivery locations for the cleaning medium can be compared. Similarly the costs and benefits of different cleaning durations and/or different cleaning mediums can be compared. At (214), an alert with an engine wash type can be sent to a computing device associated with a gate technician. For example, the computing system 600 can send an alert with an engine wash type to a computing device associated with a gate technician. The engine wash type can be the engine wash type selected based on the assessed qualitative state. In other examples, an alert with other maintenance operation types such as a type of inspection or repair to be performed can be sent.

Figure 3:
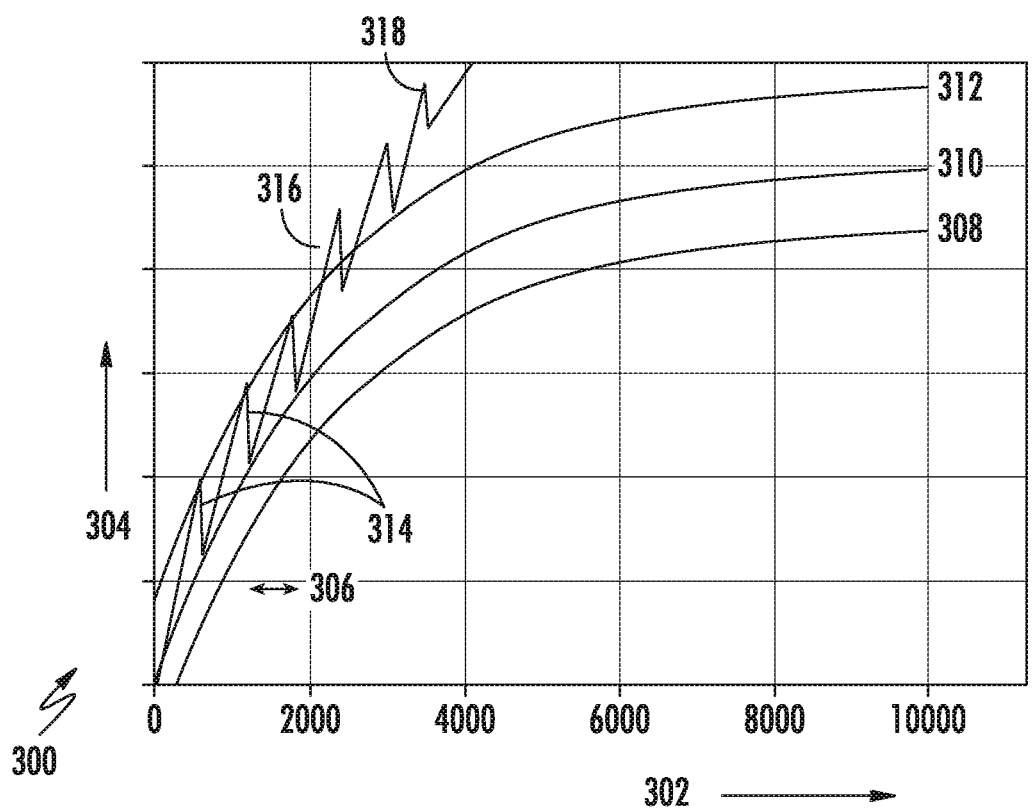
FIG. 3 depicts an example graph according to example embodiments of the present disclosure.

FIG. 3 depicts an example graph 300 according to example embodiments of the present disclosure. A horizontal axis 302 can show normalized hours and/or normalized cycles. A vertical axis 304 can show a deterioration percentage. An interval 306 can show a typical number of normalized hours and/or normalized cycles between engine washes. A lower bound 308 can show a lower bound of an expected range of deterioration for a particular normalized hour and/or a particular normalized cycle. A mid-level bound 310 can show an expected level of deterioration for a particular normalized hour and/or a particular normalized cycle. An upper bound 312 can show an upper bound of an expected range of deterioration for a particular normalized hour and/or a particular normalized cycle. A structure that includes connected lines can show deterioration for a particular engine. A rise in the structure can illustrate deterioration as the engine is in use. A plurality of drops in the structure 314 can illustrate a drop in deterioration and engine performance recovery due to an engine wash. A point 316 on the structure can illustrate a point where deterioration for the particular engine exceeds the upper bound 312 for the normalized hours and/or normalized cycle. At point 316, a more effective and likely more costly engine wash can be selected. For example, a foam clean can be selected. A point 318 on the structure can illustrate a point where a particular engine wash will not lower deterioration below the upper bound 312 for the normalized hours and/or normalized cycle. At point 318, a more effective and likely more costly engine wash can be selected. For example, a foam clean can be selected.

Figure 4:
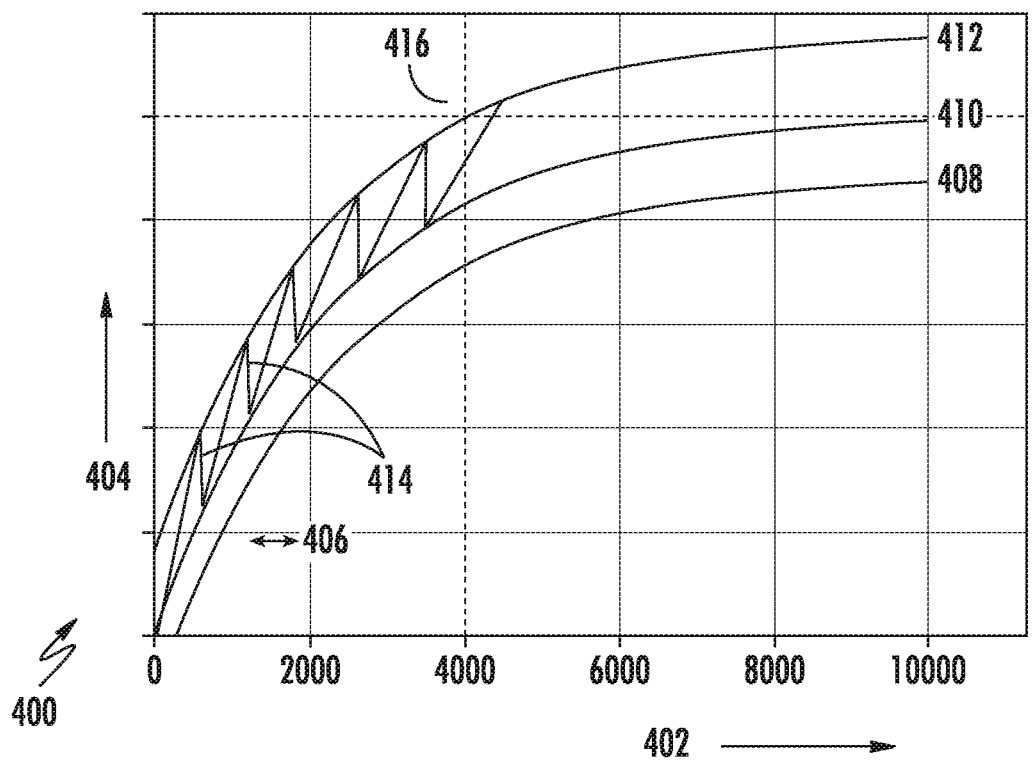
FIG. 4 depicts an example graph according to example embodiments of the present disclosure.

FIG. 4 depicts an example graph 400 according to example embodiments of the present disclosure. A horizontal axis 402 can show normalized hours and/or normalized cycles. A vertical axis 404 can show a deterioration percentage. An interval 406 can show a typical number of normalized hours and/or normalized cycles between engine washes. A lower bound 408 can show a lower bound of an expected range of deterioration for a particular normalized hour and/or a particular normalized cycle. A mid-level bound 410 can show an expected level of deterioration for a particular normalized hour and/or a particular normalized cycle. An upper bound 412 can show an upper bound of an expected range of deterioration for a particular normalized hour and/or a particular normalized cycle. A structure that includes connected lines can show deterioration for a particular engine. A rise in the structure can illustrate deterioration as the engine is in use. A plurality of drops in the structure 414 can illustrate a drop in deterioration and engine performance recovery due to an engine wash. A dashed horizontal line can illustrate a threshold deterioration. A dashed vertical line can illustrate a threshold number of hours and/or cycles, such as 4,000. In an embodiment, a particular engine wash type can be selected and/or excluded from selection when deterioration exceeds a threshold deterioration. In an embodiment, a particular engine wash type can be selected and/or excluded from selection when a number of hours and/or a number of cycles exceeds a threshold number of hours and/or a threshold number of cycles. A point 416 on the structure can illustrate a point where deterioration for the particular engine exceeds a deterioration threshold and a number of hours and/or a number of cycles exceeds a threshold number of hours and/or a threshold number of cycles. Even though the deterioration for the particular engine does not exceed the upper bound 412 for the normalized hours and/or normalized cycle, at point 416, a more effective and likely more costly engine wash can be selected because a number of hours and/or a number of cycles exceeds a threshold number of hours and/or a threshold number of cycles. For example, a foam clean can be selected.

Figure 5:
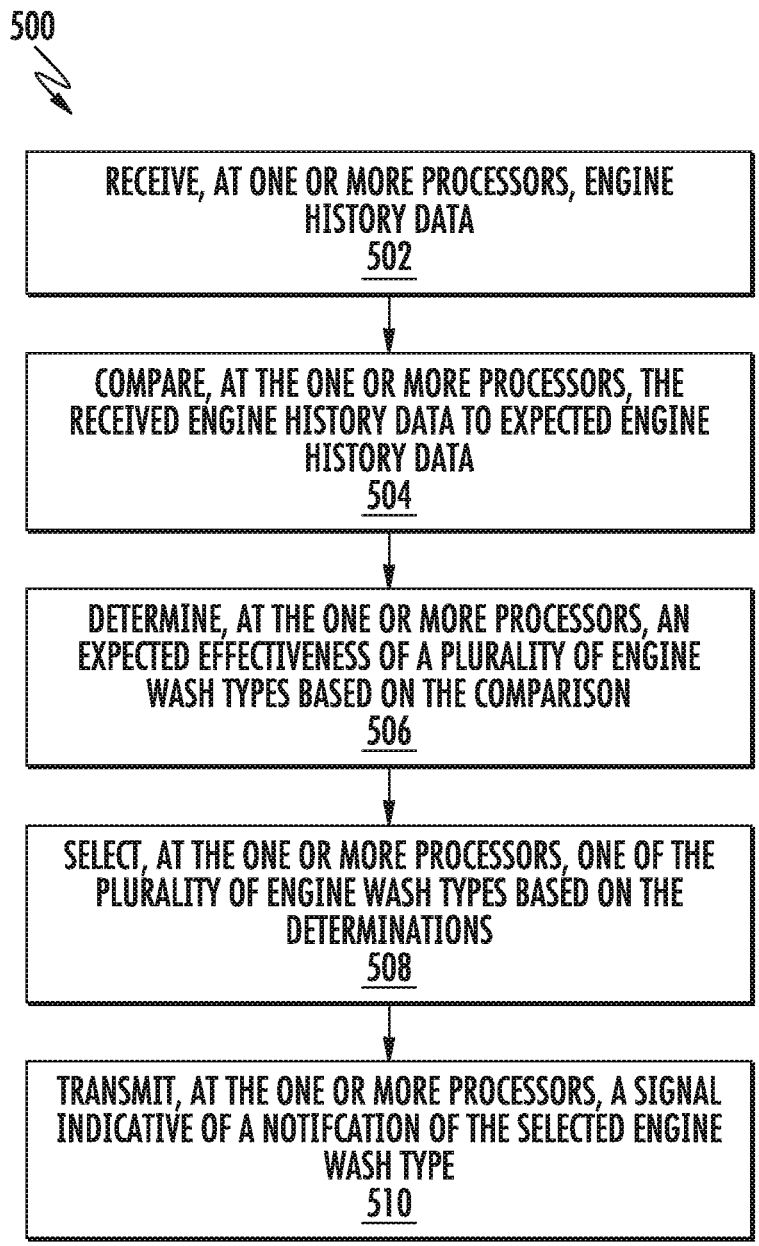
FIG. 5 depicts a flow diagram of an example method according to example embodiments of the present disclosure.

FIG. 5 depicts a flow diagram of an example method 500 for determining a maintenance operation type. FIG. 5 describes the determination of an engine wash type by way of example. It will be appreciated that the disclosed process may be used to determine other maintenance operation types, such as an inspection type or a repair type. The method of FIG. 5 can be implemented using, for instance, the computing system 600 of FIG. 9. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (502), engine history data can be received. For instance, the computing system 600 can receive engine history data. The engine history data can be engine health data and/or deployment data. The engine health data can be obtained from the one or more sensors 104, for example. The engine health data and/or the deployment data can be obtained from a database for remote diagnosis, for example. The engine health data can include one or more parameters related to engine performance, such as Exhaust Gas Temperature (EGT), EGT Hot Day Margin (EGTHDM), fuel burn, modular efficiency, other analytic measures of engine performance, the like, and/or any combination of the foregoing. The engine health data can include remote diagnosis data. The deployment data can include operational history, derate history, environmental history, a number of equivalent cycles performed by an engine, the like, and/or any combination of the foregoing. The deployment data can also include specific instructions regarding an engine wash type or other maintenance operation type. The engine health data can include remote diagnostics, operational data, data related to engine health, analytics data, trend data, health monitoring data, deployment data (describing usage), locational data, environmental data (present and historical), weather data (present and historical), satellite data, engine wash data, previous wash and repair data, engine configuration data, engine model data, hardware data, build data, part data, dimensional data, clearance data, future use and deployment data, number of cycles, number of hours, number of equivalent cycles, the like, and/or any combination of the foregoing.

At (504), the received engine history data can be compared to expected engine history data. For instance, the computing system 600 can compare the received engine history data to expected engine history data. The expected engine history data can be created by aggregating engine history data for a plurality of engines, determining engines of the plurality of engines with at least some similar history data as the received engine history data, and creating an expected range based on the history data of the determined engines with at least some similar history data. The range can be benchmark curve like in FIG. 3 and/or in FIG. 4.

At (506), an expected effectiveness of a plurality of engine wash types can be determined based on the comparison. For instance, the computing system 600 can determine an expected effectiveness of a plurality of engine wash types based on the comparison. In some embodiments, each of the plurality of engine wash types can include a cleaning medium (e.g., including chemistry, abrasiveness, volume, pressure, etc.). In some embodiments, each of the plurality of engine wash types can include a cleaning duration. In some embodiments, each of the plurality of wash types can include a cleaning delivery method (e.g., entry port location). In some embodiments, determining an expected effectiveness of a plurality of engine wash types can include comparing a cost factor and benefit factor of different engine wash types For example, a cost factor and benefit factor of different entry ports, different durations, and/or different cleaning mediums can be compared. In some embodiments, determining an expected effectiveness of a plurality of engine wash types can include determining that a first wash type will not lower a deterioration below a threshold. In an embodiment, determining an expected effectiveness of a plurality of engine wash types can include determining that a second wash type will lower the deterioration below the threshold. A deterioration can be a lowered performance of an engine. Deterioration can be lowered (and therefore, engine performance can be elevated) by an engine wash. For example, a determination can be made that an inexpensive engine wash type will not lower deterioration below the threshold. As another example, a determination can be made that a more expensive engine wash type will lower deterioration below the threshold. In other examples, step 506 can additionally or alternatively include determining an expected effectiveness of a plurality of other maintenance operation types, such as a plurality of repair types or inspection types.

Determining the expected effectiveness of a plurality of engine wash types based on the comparison can include determining when a number of engine cycles exceeds a predetermined threshold. For instance, the computing system 600 can determine when a number of engine cycles exceeds a predetermined threshold. Determining the expected effectiveness of a plurality of engine wash types based on the comparison can include, when the number of engine cycles exceeds the predetermined threshold, determining that the engine wash type includes a foam clean. For instance, the computing system 600 can, when the number of engine cycles exceeds the predetermined threshold, determine that the engine wash type includes a foam clean. Similarly, determining the expected effectiveness of a plurality of inspection types or repair types can include determining when a number of engine cycles exceeds a predetermined threshold.

Determining the expected effectiveness of a plurality of engine wash types based on the comparison can include determining when a magnitude of performance recovery from one or more previous engine washes is below a predetermined threshold. For instance, the computing system 600 can determine when a magnitude of performance recovery from one or more previous engine washes is below a predetermined threshold. When the magnitude of performance recovery from one or more previous engine washes is below the predetermined threshold, determining the expected effectiveness of a plurality of engine wash types based on the comparison can include determining that the engine wash type includes a foam clean. For instance, when the magnitude of performance recovery from one or more previous engine washes is below the predetermined threshold, the computing system 600 can determine that the engine wash type includes a foam clean. Similarly, determining the expected effectiveness of a plurality of inspection types or repair types can include determining when a magnitude of performance recovery from one or more previous engine inspections or repairs is below a predetermined threshold.

Determining the expected effectiveness of a plurality of engine wash types based on the comparison can include determining when a magnitude of performance degradation exceeds a predetermined upper limit. For instance, the computing system 600 can determine when a magnitude of performance degradation exceeds a predetermined upper limit. When the magnitude of performance degradation exceeds the predetermined upper limit, determining the expected effectiveness of a plurality of engine wash types based on the comparison can include determining that the engine wash type includes a foam clean. For instance, when the magnitude of performance degradation exceeds the predetermined upper limit, the computing system 600 can determine that the engine wash type includes a foam clean. The predetermined upper limit can be a normalized predetermined upper limit. Similarly, determining the expected effectiveness of a plurality of inspection types or repair types can include determining when a magnitude of performance degradation exceeds a predetermined limit.

At (508), one of the plurality of engine wash types can be selected based on the determinations. For instance, the computing system 600 can select one of the plurality of engine wash types based on the determinations. For example, the more expensive engine wash type can be selected. The selected engine wash type can include a cleaning medium. The cleaning medium can be applied using a delivery component. The delivery component can provide a conduit for delivering the cleaning medium to a plurality of locations on the engine. The plurality of locations on the engine can include one of the group comprising an engine inlet, a booster inlet, an igniter port, a borescope port, and an engine exhaust. The plurality of locations on the engine can enable cleaning of a component of the engine. The component of the engine can be one of the group comprising a turbine blade, a turbine nozzles, a shroud, a compressor, a fan, and a combustor. The cleaning medium can include water. The cleaning medium can include water and detergent. The cleaning medium can include water and Isopropyl Alcohol. The cleaning medium can include a foaming solution. The selected engine wash type can include a delivery method. A delivery method can include a delivery location. The delivery method can include delivery via an engine inlet. The delivery method can include delivery via a booster inlet. The delivery method can include delivery via an igniter port. The delivery method can include delivery via a borescope port. The delivery method can include delivery via an engine exhaust. The selected engine wash type can include a cleaning duration. Step 508 can include selecting one of a plurality of engine inspection or repair types in another example.

In example embodiments, selecting an engine wash type can include selecting an engine wash type having the largest net benefit under a cost factor and benefit factor analysis. For example, the cleaning delivery method such as entry location having the largest net benefit can be selected. Similarly, the cleaning duration having the largest net benefit can be selected. Additionally, the cleaning medium having the largest net benefit can be selected. At (510), a signal indicative of a notification of the selected engine wash type can be transmitted. For instance, the computing system 600 can transmit a signal indicative of a notification of the selected engine wash type. For example, the signal indicative of a notification of the selected engine wash type can be transmitted to a computing device associated with a gate technician. The signal indicative of a notification is received by one of the group comprising a cleaning technician and an automated cleaning system. Step 510 can include transmitting a signal indicative of a notification of other selected maintenance operation types, such as a type of inspection or repair.

FIGS. 6-8 are tables illustrating examples of cost factor and benefit factor analyses that can be used to select engine wash types. In some examples, the techniques described in FIGS. 6-8 may be used at block 212 of process 200 depicted in FIG. 2, or at steps 506 and 508 of process 500 depicted in FIG. 5. The tables in FIGS. 6-8 illustrate how various cost and benefit factors may be used to arrive at an optimal engine cleaning solution. The examples each show a cost factor and a benefit factor for each cleaning option. Comparing the cost factor and benefit factor such as by subtracting the cost factor from the benefit factor, gives a net benefit for each cleaning option. The net benefits may then be compared to each other so that the option with the greatest net benefit may be chosen.

FIG. 6 depicts a table 520 illustrating a cost and benefit analysis that can be performed based on a cleaning delivery method. In this example, the cleaning delivery methods comprise different entry port locations for delivering a cleaning medium. Three examples are illustrated, as well as a baseline scenario. In the examples, engine component efficiencies are tabulated for the compressor, high pressure turbine (HPT) and low pressure turbine (LPT). In the baseline scenario, the component efficiencies are each 90%.

Referring to table 520, a first example Ex 1 shows that the compressor efficiency has dropped to 85%. In this case, using either the engine inlet or the booster inlet results in a benefit factor of 0.6 and a cost factor of 0.2. The net benefit of both options is therefore 0.4. Similarly, in example Ex 1, cleaning through the igniter port, borescope port or engine exhaust all involve higher costs and lower benefits. Therefore, in example Ex 1, cleaning via the engine inlet or the booster inlet both result in equal net benefits, both of which are higher than cleaning through the igniter port, borescope port or engine exhaust.

Referring again to table 520, a second example Ex 2 shows that the HPT efficiency has dropped to 85%. In this case, the benefit factor of cleaning through either the igniter port or the borescope port increases as compared to the first example while the costs of these options remain constant. In contrast, in example Ex 2, the benefit of cleaning via both the engine inlet and the booster inlet drops. As a result, in Example 2, cleaning through either the igniter port or the borescope port is optimal. It is noted that the costs associated with cleaning via the igniter port or the borescope port may be higher than cleaning via the engine inlet and the booster inlet. However, in example Ex 2, the benefit associated with cleaning via the igniter port or the borescope port is also higher resulting in a higher net benefit. Such factors as the time and tooling associated with removing igniters and/or borescope plugs and other instrumentation may contribute to the higher costs associated with cleaning via the igniter port or the borescope port as compared to cleaning via the engine inlet and the booster inlet.

Referring again to table 520, a third example shows that the LPT efficiency has dropped to 85%. In this third example, the benefit factor of cleaning via the engine exhaust increases, resulting in the highest net benefit compared to the cleaning options discussed in examples Ex 1 and Ex 2.

FIG. 7 depicts a table 530 illustrating three examples of how an optimal duration of cleaning may be arrived at based on various conditions. The examples in table 530 focus only on various performance drops in the compressor section. However, similar approaches can be utilized to arrive at an optimal cleaning duration when cleaning other components of the engine and/or at other ports of entry.

Referring to table 530, a fourth example Ex 4 shows that when the compressor efficiency has dropped to 85%, a short duration clean will result in a benefit factor of 0.5 and a cost factor of 0.2 which yields a net benefit of 0.3. The net benefit is higher than the net benefit of the medium or long duration cleaning options, and is thus the optimal option.

Referring again to table 530, a fifth example Ex 5 shows that when the compressor efficiency has dropped to 80%, a medium duration clean will result in a benefit factor of 0.7 and a cost factor of 0.35 which yields a net benefit of 0.35. The net benefit is higher than the net benefit of either the short or long duration cleaning options, and is thus the optimal option.

Similarly, and again referring to table 530, a sixth example Ex 6 shows that when the compressor efficiency has dropped to 75%, a long duration clean will result in a benefit factor of 0.9 and a cost factor of 0.4 which yields a net benefit of 0.5. The net benefit is higher than the net benefit of either the short or medium duration cleaning options, and is thus the optimal option. It is noted that in examples Ex 4 and Ex 5, the long duration cleaning option provides a higher net benefit than the short and/or medium duration cleaning options, though not high enough to overcome the added cost of the long duration cleaning option.

FIG. 8 depicts a table 540 illustrating three examples of how a cleaning medium having an optimal cleaning medium interaction may be arrived at based on various conditions. The term "cleaning medium interaction" refers to the ability of the cleaning medium, under the conditions in which it is contacting the cleaning surface, to interact with (and thereby perturb or remove) foulants that have accumulated on the cleaning surface. For example, the cleaning medium interaction of a cleaning medium may be increased by altering the chemistry of a cleaning medium so as to chemically interact with the accumulated foulants. Similarly, by volumetrically increasing the cleaning medium, the cleaning medium interaction may be increased. In addition, an increase in the hydrostatic pressure of the cleaning medium or the velocity of the cleaning medium may both result in an increase in the cleaning medium interaction. Increasing the abrasiveness of the cleaning medium may also increase the cleaning medium interaction. Other modifications to the cleaning medium (such as viscosity and temperature), under the conditions in which it is contacting the cleaning surface, may also result in an increase in the cleaning medium interaction. Selecting a cleaning medium may refer to selecting a chemistry, volume, pressure, velocity, abrasiveness, viscosity, and/or temperature for a cleaning medium.

Similar to table 530, table 540 focuses on a single component of a gas turbine engine, the high pressure turbine in this case. However, similar approaches can be utilized to arrive at the optimal cleaning duration when cleaning other components of an engine and/or via other ports of entry.

Referring to table 540, a seventh example shows that the HPT efficiency has dropped to 85%. In this case, a low interaction cleaning option results in a benefit factor of 0.35 and a cost factor of 0.2. This yields a net benefit of 0.15 which is higher than the net benefit of the medium interaction or the high interaction cleaning options and is thus the optimal option in this example.

Referring again to table 540, an eighth example shows that the HPT efficiency has dropped to 80%. In this case, a medium interaction cleaning option results in a benefit factor of 0.5 and a cost factor of 0.3, yielding a net benefit of 0.2. This net benefit is higher than the net benefit of the low interaction or the high interaction cleaning options, and is thus the optimal option in this example.

Referring again to table 540, a ninth example shows that the HPT efficiency has dropped to 75%. In this case, a high interaction cleaning option results in a benefit factor of 0.7 and a cost factor of 0.4, yielding a net benefit of 0.3. This net benefit is higher than the net benefit of the medium interaction or the low interaction cleaning options, and is thus the optimal option in this example.

The tables in FIGS. 6-8 illustrate how engine performance data can be used to select the optimal choice within each single variable considered in washing an engine. The variables include, but are not limited to, cleaning medium, duration of cleaning, and the cleaning delivery method. These variables are shown in FIGS. 6-8 individually, for illustration purposes. However, a person of ordinary skill in the art will appreciate that the variables in the tables can be used both individually or in any combination to select the optimal engine wash type for each specific engine as the immediate conditions of each case dictate.

Figure 9:
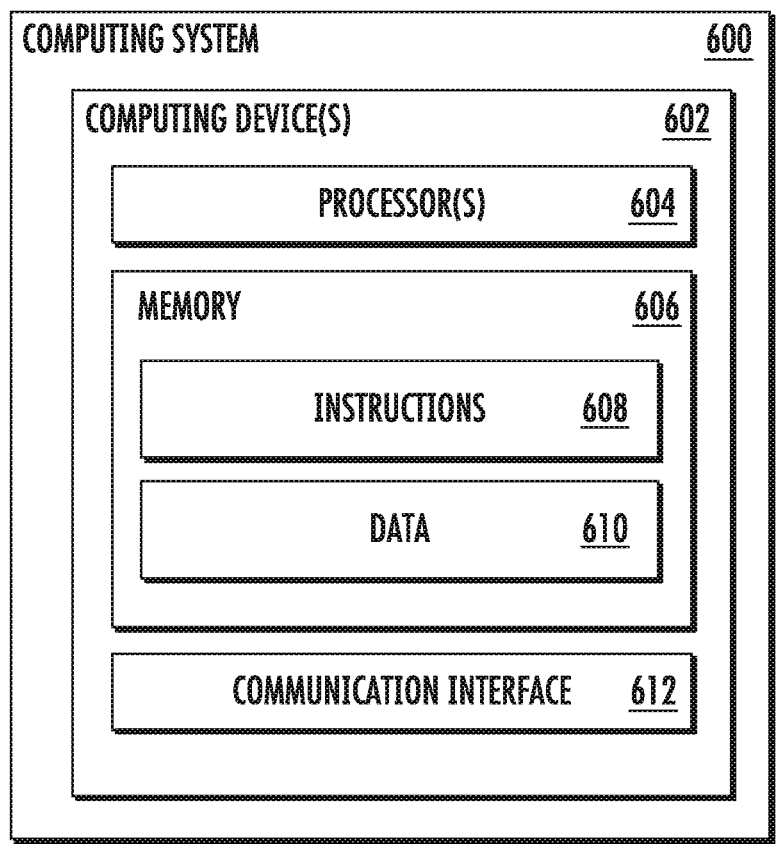
FIG. 9 depicts a computing system for implementing one or more aspects according to example embodiments of the present disclosure.

FIG. 9 depicts a block diagram of an example computing system 600 that can be used by an aerial vehicle, a ground system, or other systems of the aerial vehicle to implement methods and systems according to example embodiments of the present disclosure. As shown, the computing system 600 can include one or more computing device(s) 602. The one or more computing device(s) 602 can include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable media, RAM, ROM, hard drives, flash drives, or other memory devices.

The one or more memory device(s) 606 can store information accessible by the one or more processor(s) 604, including computer-readable instructions 608 that can be executed by the one or more processor(s) 604. The instructions 608 can be any set of instructions that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations, such as the operations for selecting an engine wash type or other maintenance operation type, as described with reference to FIG. 2 and/or FIG. 5, and/or any other operations or functions of the one or more computing device(s) 602.

The memory device(s) 606 can further store data 610 that can be accessed by the processors 604. For example, the data 610 can include one or more parameters related to engine performance, engine health history, operational history, derate history, environment history, engine cycle information, etc., as described herein. The data 610 can include one or more table(s), function(s), algorithm(s), model(s), equation(s), etc. for selecting an engine wash type or other maintenance operation type according to example embodiments of the present disclosure.

The one or more computing device(s) 602 can also include a communication interface 612 used to communicate, for example, with the other components of system. The communication interface 612 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for enhancing an engine wash routine comprising:
   one or more memory devices; and
   one or more processors configured to:
      receive first engine history data;
      compare the first engine history data to expected engine history data;
      determine an expected effectiveness of a plurality of engine wash types based on comparing the first engine history data to the expected engine history data, wherein determining the expected effectiveness of the plurality of engine wash types comprises:
         determining when a number of engine cycles exceeds a predetermined threshold;
         when the number of engine cycles exceeds the predetermined threshold, determining that the engine wash type comprises a foam clean;
      select one of the plurality of engine wash types based on the expected effectiveness of the plurality of engine wash types; and
      transmit a signal indicative of a notification of a selected engine wash type.

2. The system of claim 1, wherein the first engine history data comprises at least one of remote diagnostics, environmental data, or operational data.

3. The system of claim 1, wherein determining the effectiveness of a plurality of engine wash types comprises:
   determining when a magnitude of performance recovery from one or more previous engine washes is below a predetermined threshold; and
   when the magnitude of performance recovery from one or more previous engine washes is below the predetermined threshold, determining that the engine wash type comprises a foam clean.

4. The system of claim 1, wherein determining the expected effectiveness of the plurality of engine wash types comprises:
   determining when a magnitude of performance degradation exceeds a predetermined upper limit; and
   when the magnitude of performance degradation exceeds the predetermined upper limit, determining that the engine wash type comprises a foam clean.

5. The system of claim 4, wherein the predetermined upper limit is a normalized predetermined upper limit.

6. The system of claim 1, wherein the selected engine wash type comprises a cleaning duration.

7. The system of claim 1, wherein the selected engine wash type comprises a cleaning medium and a cleaning delivery method, the system further comprising:

a delivery component, wherein the delivery component provides a conduit for delivering the cleaning medium to one or more locations of the engine, and wherein the cleaning delivery method includes one or more locations including at least one of an engine inlet, a booster inlet, an igniter port, or a borescope port.

8. The system of claim 7, wherein the cleaning medium comprises at least one of water, water and detergent, water and isopropyl alcohol, or a foaming solution.

9. The system of claim 8, wherein:
the one or more locations of the engine enable cleaning of a component of the engine; and
wherein the component of the engine comprises a turbine blade, a turbine nozzle, a shroud, a compressor, a fan, or a combustor.

10. A method for enhancing an engine wash routine comprising:
receiving, at one or more processors, first engine history data;
comparing, at the one or more processors, the first engine history data to expected engine history data;
determining, at the one or more processors, an expected effectiveness of a plurality of engine wash types based on comparing the first engine history data to the expected engine history data, wherein each of the plurality of engine wash types comprises a cleaning medium, and wherein determining the engine wash type based on the comparison further comprises:
determining, at the one or more processors, that the magnitude of performance recovery from one or more previous engine washes is below a predetermined threshold; and
when the performance recovery is below the predetermined threshold, determining, at the one or more processors, that the engine wash type comprises a foam clean;
selecting, at the one or more processors, one of the plurality of engine wash types based on the expected effectiveness of the plurality of engine wash types; and
transmitting, at the one or more processors, a signal indicative of a notification of a selected engine wash type.

11. The method of claim 10, wherein each of the cleaning mediums comprises at least one of water, water and detergent, water and isopropyl alcohol, or a foaming solution.

12. The method of claim 10, wherein the engine history data comprises at least one of remote diagnostics, environmental data, or operational data.

13. The method of claim 10, determining the engine wash type based on the comparison further comprises:
determining, at the one or more processors, when a number of engine cycles exceeds a predetermined threshold; and
when the number of engine cycles exceeds the predetermined threshold, determining, at the one or more processors, that the engine wash type comprises a foam clean.

14. The method of claim 10, wherein determining the engine wash type based on the comparison further comprises:
determining, at the one or more processors, that the magnitude of performance degradation exceeds a predetermined upper limit; and
when the magnitude of performance degradation exceeds the predetermined upper limit, determining, at the one or more processors, that the engine wash type comprises a foam clean.

15. The method of claim 10, wherein the signal indicative of the notification is received by at least one of a cleaning technician or an automated cleaning system.

16. A non-transitory computer-readable medium storing computer instructions, that when executed by one or more processors, cause the one or more processors to perform operations, the operations comprising:
receive first engine history data;
compare the first engine history data to expected engine history data;
determine an expected effectiveness of a plurality of maintenance operation types based on comparing the first engine history data to the expected engine history data, and wherein determining the engine wash type based on the comparison further comprises:
determining, at the one or more processors, that the magnitude of performance degradation exceeds a predetermined upper limit; and
when the magnitude of performance degradation exceeds the predetermined upper limit, determining, at the one or more processors, that the engine wash type comprises a foam clean;
select one of the plurality of maintenance operation types based on the expected effectiveness of the plurality of maintenance operation types; and
transmit a signal indicative of a notification of a selected maintenance operation type.

17. The non-transitory computer-readable medium of claim 16, wherein the selected maintenance operation type comprises at least one of an engine wash type, an engine inspection type, or an engine repair type.

18. The non-transitory computer-readable medium of claim 16, wherein the first engine history data comprises at least one of remote diagnostics, environmental data, or operational data.

* * * * *